United States Patent [19]

Sugaya et al.

[11] Patent Number: 4,551,119
[45] Date of Patent: Nov. 5, 1985

[54] HYDRAULIC APPARATUS FOR A CONTINUOUSLY VARIABLE TRANSMISSION

[75] Inventors: Masami Sugaya, Susono; Daisaku Sawada, Gotenba; Susumu Okawa, Numazu, all of Japan

[73] Assignee: Toyota Jidosha Kabushiki Kaisha, Aichi, Japan

[21] Appl. No.: 579,969

[22] Filed: Feb. 14, 1984

[51] Int. Cl.$^4$ ............................................. F16H 11/04
[52] U.S. Cl. ......................................... 474/28; 474/18
[58] Field of Search .................. 474/28, 18, 17, 11, 474/12, 51

[56] References Cited

U.S. PATENT DOCUMENTS 4,094,203  1/1978  Van Deursen .................. 474/28
4,369,675  1/1983  Van Deursen .................. 474/18 X
4,458,318  7/1984  Smit et al. ....................... 474/28 X
4,459,879  7/1984  Miki et al. ....................... 474/28
4,475,416 10/1984  Underwood ..................... 474/28 X

OTHER PUBLICATIONS

Japanese Laid Open Patent Publication Sho 49-103322 published Sep. 30, 1974.

Primary Examiner—Stephen J. Novosad
Assistant Examiner—Thuy M. Bui
Attorney, Agent, or Firm—Parkhurst & Oliff

[57] ABSTRACT

A hydraulic apparatus for a continuously variable transmission, through which the RPM ratios of a driving pulley to a driven pulley is consecutively varied. Such RPM ratios are varied by electrically controlling the volume of hydraulic fluid supplied to or drained from a cylinder of a driving pulley.

14 Claims, 3 Drawing Figures

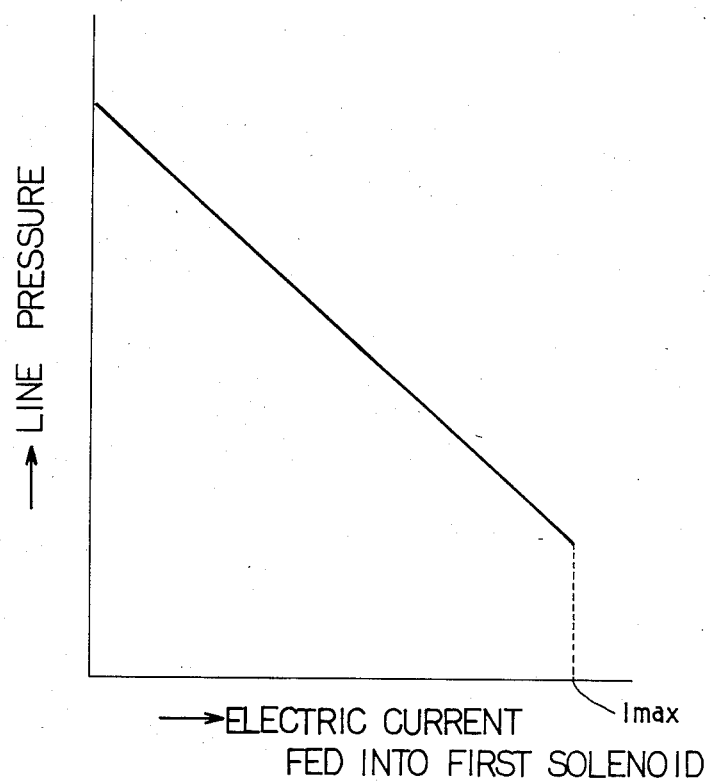

HYDRAULIC APPARATUS FOR A CONTINUOUSLY VARIABLE TRANSMISSION

BACKGROUND OF THE INVENTION

The present invention relates to a hydraulic apparatus for a continuously variable transmission for motor vehicles, and more particularly to a hydraulic apparatus which constantly varies speed ratios.

A continuously variable transmission, having a V-belt extending between driving and driven pulleys, permits control of the number of the revolutions of the driven pulley by varying the size of the V-shaped opening in either the driving pulley, the driven pulley or simultaneously varying both of the pulleys. The size of the V-shaped opening is varied by changing the amount of pressure being fed into a hydraulic cylinder of either of the pulleys. Hence, the effective diameter of the pulley can be varied by changing the amount of pressure being fed into the hydraulic cylinder, thereby allowing for a continuously varying ratio of driving pulley diameter to driven pulley diameter. The V-shaped openings on the driving and driven pulleys are each defined by an area between a fixed pulley and a movable pulley, which is dependent upon the pressure inputted to the hydraulic cylinders. In order to provide hydraulic pressure to each of the movable pulleys, a hydraulic apparatus is provided.

A prior hydraulic apparatus for a continously variable transmission was mechanically controlled as shown, for example U.S. Pat. No. 4,094,203. Hence, severe limitations were realized in the amount of potential change in the width of the pulleys and the rate at which the width changed when compared to an electronic control of the CVT.

SUMMARY OF THE INVENTION

The present invention was made in view of the foregoing background and to overcome the foregoing drawbacks. It is accordingly an object of this invention to provide a hydraulic apparatus for controlling a CVT which continuously varies the ratio of driving pulley diameter to driven pulley diameter.

To attain the above object, a hydraulic apparatus for a continuously variable transmission used in motorized vehicles, comprises a regulator valve, a first electric control means, a hydraulic fluid supply means, a hydraulic fluid flow control means and a second electric control means. The regulator valve controls the pressure of the hydraulic fluid fed by the hydraulic fluid supply means, thereby generating a line pressure. Further, the regulator valve constantly supplies the line pressure to a hydraulic cylinder of the driven pulley. The first electric control means is connected with the regulator valve, thereby varying the amount of a line pressure. The hydraulic fluid flow control means controls the volume of hydraulic fluid supplied to or drained from the hydraulic cylinder of the driving pulley. Lastly, the second electric control means is connected with the hydraulic fluid supplied to or drained from the hydraulic cylinder of the driving pulley.

Thus, the hydraulic cylinder of the driven pulley is constantly supplied with a line pressure, and the amount of hydraulic fluid in the hydraulic cylinder of the driving pulley is varied by the hydraulic flow control means, by the volume of the hydraulic fluid supplied to or drained from the cylinder. In accordance with this variation, the diameter ratio between the driving pulley and the driven pulley is continuously varied.

BRIEF DESCRIPTION OF THE DRAWINGS

The above object, features and advantages of the present invention will become more apparent from the following description of the preferred embodiments taken in conjunction with the accompanying drawings, wherein:

FIG. 3 is a graph showing the relationship between the line pressure and an electric current supplied to a solenoid in a regulator valve.

DETAILED DESCRIPTION OF THE PREFERRED EMBODIMENTS

The present invention is described in detail with reference to the accompanying drawings which illustrate different embodiments of the present invention.

Figure 1:
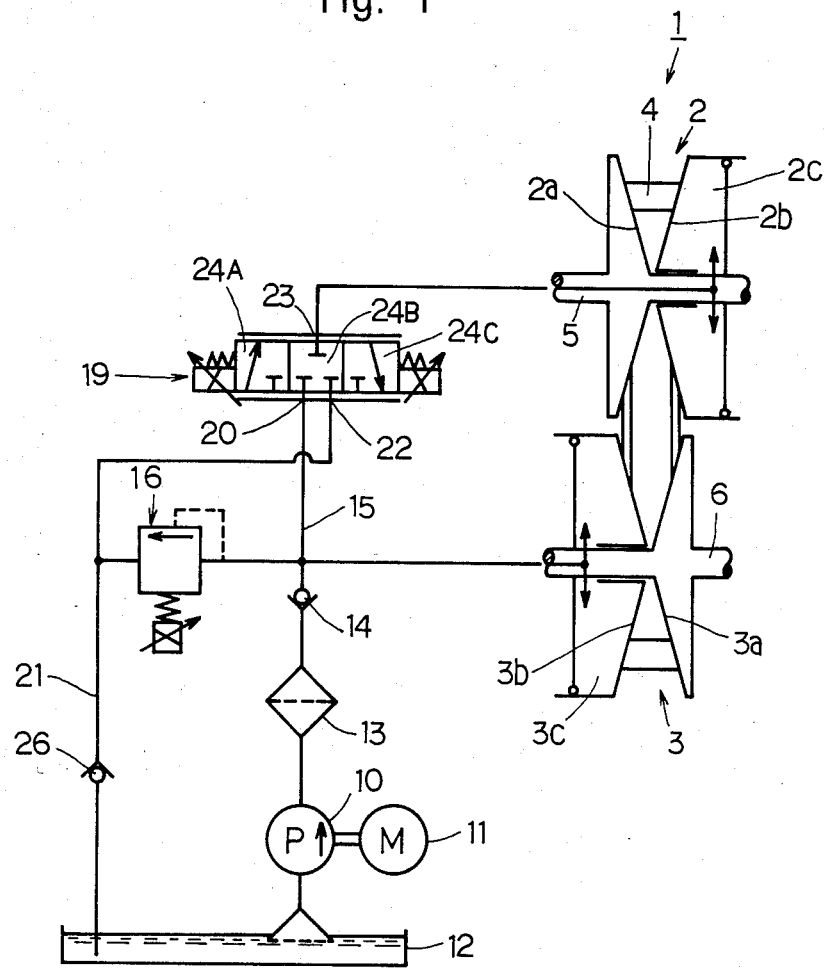
FIG. 1 is a hydraulic circuit diagram of the present invention.

FIG. 1 illustrates a hydraulic circuit diagram of the present invention. A continuously variable transmission is represented by the numeral 1, and the same is mounted on a motor vehicle and connected with an engine (not shown in the drawings) at one of its ends and with shafts connected to driving wheels at its other end.

The CVT continuously varies the RPM ratio between the input shaft, connected to the engine, and the output shaft, connected to the driving wheels. The continuously variable transmission 1 includes the pulleys 2 and 3. The pulley 3 is a driving pulley mounted on a driving and input shaft 5, and is driven by the engine. The pulley 3 is a driven pulley mounted on a driven and output shaft 6. The torque of the shaft 6 is transmitted to the wheels. A torque transmitting V-belt 4 extends between the pulleys 2 and 3. The driving pulley 2 has a non-movable member 2a, which is fixed to and rotatable with the input shaft 5, and a movable member 2b, which is axially movable on and rotatable with the input shaft 5. The movable member 2b is axially displaced by the pressure exerted upon it by a hydraulic cylinder 2c. When the movable member 2b is axially displaced in a direction toward the non-movable member 2a, the width between the members 2a and 2b is decreased. This results in an increase in the effective diameter of the driving pulley 2. Hence, the RPM ratio increases (RPM of the driven pulley/RPM of the driving pulley).

Similarly, the driven pulley 3 has a non-movable member 3a, which is fixed to and rotatable with the driven shaft 6, and a movable member 3b, which is axially displaced on and rotatable with the driven shaft 6. The movable member 3b is axially displaced by the pressure exerted upon it by a hydraulic cylinder 3c. When the movable member 3b is axially displaced in a direction toward the non-movable member 3a, the width between the members 3a and 3b is decreased, thereby increasing the effective diameter of the pulley 3.

To minimize the amount of power consumed by a hydraulic fluid pump, the hydraulic pressure in the cylinder 3c is controlled to be as small as possible while maintaining a torque necessary to keep the V-belt 4 from slipping while rotating around the driving pulley 2 and the driven pulley 3. The hydraulic pressure of the cylinder 2c is varied to adjust the RPM ratio. The amount of pressure in the hydraulic cylinder 2c is designed to be smaller than that of the pressure in the hydraulic cylinder 3c. However, even though the value of the hydraulic pressure supplied to the hydraulic cylinder 2c is less than the value of the hydraulic pressure supplied to the hydraulic cylinder 3c, the system is designed so that a greater overall hydraulic pressure is realized in the hydraulic cylinder 2c than in the hydraulic cylinder 3c because of the presence of double pistons in the cylinder 2c. Hence, it is possible to obtain a RPM ratio between the driven pulley and driving pulley of more than or equal to one.

The CVT is supplied with hydraulic fluid in the following manner. A hydraulic fluid pump 10, driven by a motor 11, pumps hydraulic fluid from a reservoir 12, through a filter 13 and a check valve 14, into a passage 15. The check valve 14 only allows hydraulic fluid to flow in a single direction, from the filter 13 and into the passage 15. A regulator valve 16 controls the pressure supplied to a passage 15, thereby generating a specific line pressure in the passage 15. The line pressure in the passage 15 is supplied to a cylinder 3c of the driven pulley 3 and to a flow control valve 19. The flow control valve 19 is a three port connection valve, and includes an inlet port 20 communicated through the regulator valve 16 with the passage 15, a drain port 22 communicated with a drain passage 21 and an outlet port 23 communicated with the cylinder 2c of the driving pulley. When the flow control valve 19 is in a first position 24A, as shown in FIG. 1, the inlet port 20 is communicated with the outlet port 23. When the flow control valve 19 is in a second position, shown by 24B, there is no communication between the three ports 20, 22 and 23. Finally, when the flow control valve 19 is in a third position 24C, the outlet port 23 communicates with the drain port 22. A check valve 26 is provided on the drain passage 21. The valve 26 only allows hydraulic fluid to flow in a single direction, from the flow control valve 19, to the hydraulic fluid reservoir 12.

Figure 2:
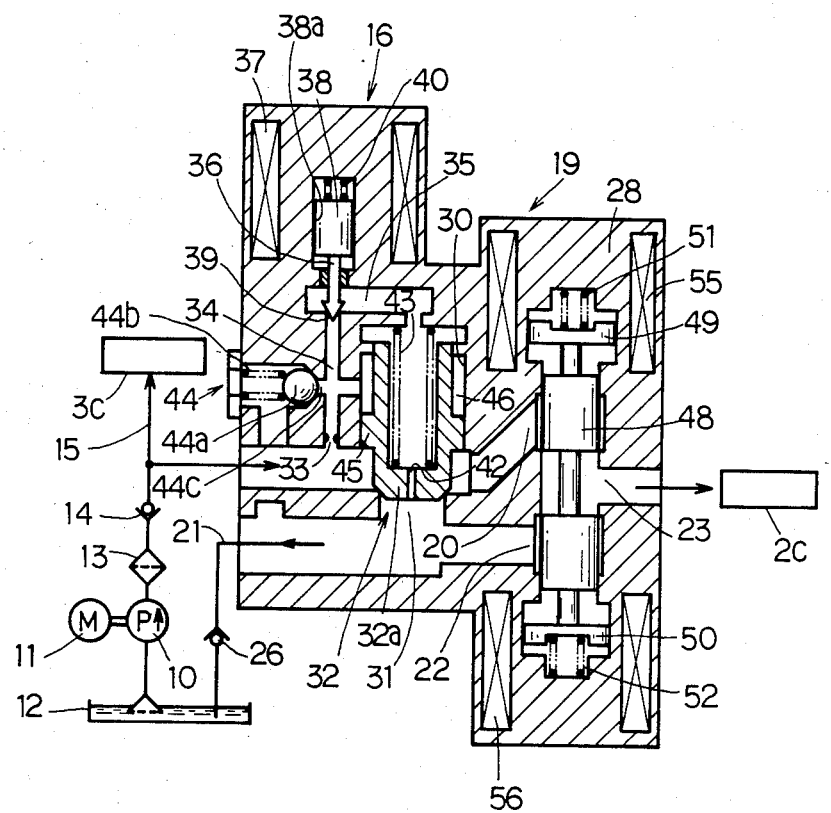
FIG. 2 is an enlarged and detailed view of an embodiment of the present invention.

FIG. 2 shows a detailed construction of the regulator valve 16 and the flow control valve 19. In this embodiment, both valves 16 and 19 are provided in the same valve body 28. The regulator valve 16 has a valve spool 32, a puppet shaped valve member 36 and a relief valve 44. The valve spool 32 slides in a bore 30, thereby opening or closing a port 31, defined between the passage 15 and the drain passage 21. The valve spool 32 has a radially extended portion 45 and a head portion 32a. The head portion 32a has a small hole 42 therein. A chamber 46 is provided and defined between the radially extending outer wall portion 45 of the spool 32 and an inner wall of the valve body. A compression coil spring 43 is located between the head portion 32a of the valve spool 32 and the inner wall of the valve body. The spring 43 biases the valve spool 32 in a direction which tends to close the port 31. The puppet shaped valve member 36 controls the flow of hydraulic fluid at a port 39, which connects a passage 34 with a hydraulic fluid chamber 35. A plunger 38 is fixed to the member 36, and slides in a bore 38a. A compression coil spring 40 is provided between the plunger 38 and the inner wall of the valve body. The spring 40 biases the valve member 36 in a manner which closes the port 39. A first linear solenoid 37 is positioned around the plunger 38 in the valve body 28 and functionally pulls the plunger 38 against the biasing force of the spring 40, whenever the solenoid 37 is actuated.

An orifice 33 is provided in the passage 34, which communicates with the passage 15. A relief valve 44 is also provided in the passage 34 and has a check ball 44a and a spring 44b, which biases the ball 44a in a direction which tends to close a port 44c. When the pressure in the chamber 46 exceeds a predetermined value, the ball 44a is displaced against the force of the spring 44b. In this condition, the hydraulic fluid in the passage 34 returns through the port 44c to the passage 21.

The flow control valve 19 is provided in a position between the regulator valve 16 and the cylinder 2c of the driving pulley. The flow control valve 19 has a valve spool 48, plungers 49 and 50, a second solenoid 55 and a third solenoid 56. The valve spool 48 controls the communication between the ports 20, 22 and 23. Plungers 49 and 50 are fixed to each end of the spool 48, respectively. A compression spring 51 biases the plunger 49 in a direction which tends to open the drain port 22. Another compression spring 52 is provided in a position opposite to that of the spring 51 and biases the plunger 50 in a direction which tends to close the drain port 22. Further, the second solenoid 55 is provided around the plunger 49 in the valve body 28. When the second solenoid 55 is actuated, the solenoid 55 pulls the plunger 49 by electromagnetic force against the biasing force of the spring 51. The third solenoid 56 is provided around the plunger 50 in the valve body 28. When the solenoid 56 is actuated, the solenoid 56 pulls the plunger 50 by electromagnetic force against the biasing force of the spring 52.

Once the engine is started and the system is placed in operation, the hydraulic fluid pump 10, driven by the motor 11, pumps the fluid in the reservoir 12 through the filter 13 and the check valve 14 and into the passage 15. The passage 15 is communicated with the hydraulic cylinder 3c of the driven pulley and the regulator valve 16. When the electric current inputted to the first solenoid 37 increases, the solenoid 37 pulls the plunger 38 against the force of the spring 40. Consequently, the pointed end of the valve member 36 lifts up, and the opening area of the port 39 increases. Because the chamber 35 is communicated through the small hole 42 with the drain passage 21, the volume of hydraulic fluid drained increases when the opening area of the port 39 increases. In this condition, the hydraulic pressure in the chamber 46 decreases. When the force biasing the valve spool 32 toward the closing of the port 31 becomes less than the force biasing the valve spool 32 in the opposite direction, the valve spool 32 is displaced away from the port 31, thereby opening it up. Hence, the line pressure of the passage 15 decreases.

FIG. 3 illustrates the relationship between the line pressure and the electric current fed into the first solenoid 37. If the electric current fed into the first solenoid 37 approaches zero, as in the case of electrical disconnection of the solenoid, the spring 40 biases the plunger 38 so that it moves in a direction which tends to close the port 39. In this circumstance, the pressure of the hydraulic fluid in the chamber 46 has the largest value, thereby resulting in the line pressure in the passage 15 to be the largest value. The line pressure controlled by the valve 16 is supplied to the cylinder 3c of the driven pulley.

When an electric current actuates the second and third solenoids 55 and 56, the valve spool 48 of the flow control valve 19 assumes a neutral position equivalent to the position shown in FIG. 2 (i.e., the second position 24B in FIG. 1). In this condition, there is no flow communication between the ports 20, 22 and 23. When only the second solenoid 55 is actuated by an electric current, the solenoid 55 electromagnetically pulls the plunger 49 against the biasing force of the spring 51. Hence, the opening defined between the inlet port 20 and the outlet port 23 also increases in accordance with the increase of the actuating current. Consequently, the volume of the hydraulic fluid supplied to the cylinder 2c of the driving pulley increases. The increase in supply of hydraulic fluid to the cylinder 2c results in an increase in the RPM ratio. Contrary to this, when the third solenoid 56 is actuated by an electric current, the solenoid 56 electromagnetically pulls the plunger 50 against the biasing force of the spring 52. In this condition, the opening defined between the drain port 22 and the outlet port 23 increases, resulting in the increase in the amount of fluid drained from the cylinder 2c of the driving pulley. Consequently, the RPM ratio decreases.

Thus, the RPM ratios are controlled by varying the amount of hydraulic fluid suppled to or drained from the hydraulic cylinder of the driving pulley.

While the present invention has been described in its preferred embodiments, it is to be understood that the invention is not limited thereto, and may be otherwise embodied within the scope of the following claims.

What is claimed is:

1. A hydraulic apparatus for a continuously variable transmission for motor vehicles having a driving pulley with a first fixed memeber and a first movable member, the movable member being actuated by a first hydraulic cylinder to form a V-shaped opening between the fixed and movable first members, a driven pulley with a second fixed member and a second movable member, said second movable member being similarly actuated by a second hydraulic cylinder to form a similar V-shaped opening between said second fixed member and said second movable member, and a belt member spanning said pulleys, said hydraulic apparatus comprising:
   a hydraulic fluid reservoir containing hydraulic fluid;
   a hydraulic fluid pump for pumping the hydraulic fluid from the reservoir;
   a first oil passage having a first pressure and connecting said pump to said second hydraulic cylinder;
   a second oil passage communicating with said reservoir and having a port communicating with said first oil passage;
   a regulator valve means located between said first and second passages for controlling the pressure of the hydraulic fluid pumped by the hydraulic fluid pump to the second hydraulic cylinder for generating the first pressure which is constantly supplied to the second hydraulic cylinder of the driven pulley;
   said regulator valve means including a first oil chamber having an inlet communicating with a second oil chamber within said regulator valve means and an outlet communicating with said second oil passage, said second oil chamber communicating with said first oil passage through an orifice, a first valve member located at the inlet of the first oil chamber for controlling a second pressure of hydraulic fluid in said second oil chamber, and a second valve member located at the port of the second oil passage for controlling a first pressure of hydraulic fluid in said first oil passage, the outlet of the first oil chamber being defined within the second valve member, said second valve member being biased to open the port of the second oil passage by the first pressure and being biased in an opposite direction by the second pressure;
   a first electric control means connected with the regulator valve means, for varying the value of the first pressure;
   hydraulic fluid flow control means for controlling the volume of hydraulic fluid supplied to or drained from the hydraulic cylinder of the driving pulley; and
   a second electric control means connected with the hydraulic fluid control means, for varying the volume of hydraulic fluid supplied to or drained from the hydraulic cylinder of the driving pulley.

2. The hydraulic apparatus of claim 1, wherein the regulator valve means and the hydraulic fluid flow control means are provided in a single valve body.

3. The hydraulic apparatus of claim 2, wherein the first electric control means comprises a first solenoid valve for controlling the volume of the hydraulic fluid drained from the hydraulic fluid of the driven pulley.

4. The hydraulic apparatus of claim 2, wherein the second electric control means comprises a second and third solenoid valves for varying the volume of hydraulic fluid supplied to or drained from the hydraulic cylinder of the driving pulley.

5. The hydraulic apparatus of claim 1, wherein:
   the second member has more than one land, one of the lands being subjected to the first pressure of the first oil passage which tends to increase the volume of the hydraulic fluid drained and at least a second land subjected to the second pressure of the second oil chamber which tends to decrease the volume of the hydraulic fluid drained; and
   biasing means for biasing the second valve member in a direction which tends to decrease the volume of the hydraulic fluid drained and increase the value of the first pressure.

6. The hydraulic apparatus of claim 5, wherein the first electric control means is a solenoid valve that electromagnetically pulls the first valve member in a direction that tends to decrease the second pressure of the second oil chamber.

7. The hydraulic apparatus of claim 1, wherein the second electric control means, comprises:
   a second solenoid valve for electromagnetically moving a valve member against the force of a first biasing means when a second solenoid is actuated; and
   a third solenoid valve for moving the valve member against the force of a second biasing means when a third solenoid is acutated.

8. A hydraulic apparatus for a continuously variable transmission for motor vehicles having a driving pulley with a first fixed member and a first movable member, the movable member being actuated by a first hydraulic cylinder to form a V-shaped opening between the fixed and movable members, a driven pulley with a second fixed member and a second movable member, said second movable member being similarly actuated by a second hydraulic cylinder to form a V-shaped opening between said second fixed member and said second movable member, and a belt member spanning said pulleys, said hydraulic apparatus comprising:
   a hydraulic fluid reservoid containing hydraulic fluid;
   a hydraulic fluid pump for pumping the hydraulic fluid from the reservoir;

a first oil passage having a first pressure and connecting said hydraulic fluid pump to the second hydraulic cylinder;

a second oil passage communicating with said hydraulic fluid reservoir and having a port communicating with said first oil passage;

a regulator valve means located between the first and second passages for controlling the pressure of the hydraulic fluid pumped by the hydraulic pump to the second hydraulic cylinder, said regulator valve means having a third oil passage, a first oil chamber, a second oil chamber, a first valve member and a second valve member;

the third oil passage having an orifice opened in said first oil passage;

the first oil chamber having an inlet opened in the third oil passage and an outlet communicating with said second oil passage, the first oil chamber being defined between inner walls of the second valve member;

the second oil chamber communicating with the third oil passage, the second oil chamber being defined between a first inner wall of said regulator valve and a first outer wall of the second valve member;

the first valve member being disposed on an inlet of the first oil chamber and controlling a second oil passage and the second oil chamber;

the second valve member disposed on a port of the second oil passage and controlling a first pressure of the hydraulic fluid in said first oil passage, the outlet of the first oil chamber defined within the second valve member, the second valve member being biased in the direction which tends to open the port of the second oil passage by the first pressure of the hydraulic fluid in said first oil passage, and biased in the opposite direction by the second pressure of the hydraulic fluid in the second oil chamber;

a first electric control means connected with the regulator valve means, for varying the value of the first pressure;

hydraulic fluid flow control means for controlling the volume of hydraulic fluid supplied to or drained from the hydraulic cylinder of the driving pulley; and a second electric control means connected with the hydraulic fluid flow control means, for varying the volume of hydraulic fluid supplied to or drained from the hydraulic cylinder of the driving pulley.

9. The hydraulic apparatus of claim 8, wherein the regulator valve means and the hydraulic fluid flow control means are provided in a single valve body.

10. The hydraulic apparatus of claim 9, wherein the first electric control means comprises a first solenoid valve for controlling the volume of the hydraulic fluid drained from the driven pulley.

11. The hydraulic apparatus of claim 9, wherein the second electric control means comprises second and third solenoid valves for varying the volume of hydraulic fluid supplied to or drained from the hydraulic cylinder of the driving pulley.

12. The hydraulic apparatus of claim 8, wherein:

the second valve member has more than one land, one of the lands being subjected to the first pressure of the first oil passage which tends to increase the volume of the hydraulic fluid drained and at least a second land subjected to the second pressure of the second oil chamber which tends to decrease the volume of the hydraulic fluid drained;

and biasing means for biasing the second valve member in a direction which tends to decrease the volume of the hydraulic fluid drained and increase the value of the first pressure.

13. The hydraulic apparatus of claim 12, wherein the first solenoid valve electromagnetically pulls the first valve member in a direction which tends to decrease the second pressure of the second oil chamber.

14. The hydraulic apparatus of claim 8, wherein the second electric control means, comprises:

a second solenoid valve for electromagnetically moving a valve member against the force of a first biasing means when a second solenoid is actuated; and a third solenoid valve for moving the valve member against the force of a second biasing means when a third solenoid is actuated.

* * * * *